United States Patent [19]

Müller-Bardarowa et al.

[11] Patent Number: 5,888,435
[45] Date of Patent: Mar. 30, 1999

[54] PRODUCTION OF THERMOFORMABLE COMPONENTS

[75] Inventors: Liliane Müller-Bardarowa, Kempen; Axel Weitz, Geldern; Burkhard Klein, Grefrath; Eugen Prömper, Viersen, all of Germany

[73] Assignee: Becker Group Europe GmbH, Germany

[21] Appl. No.: 861,335

[22] Filed: May 21, 1997

[30] Foreign Application Priority Data

May 21, 1996 [DE] Germany .................. 196 20 289.2

[51] Int. Cl.⁶ ........................................ B27N 1/02
[52] U.S. Cl. ................................ 264/86; 264/122
[58] Field of Search ......................... 264/86, 122

[56] References Cited

U.S. PATENT DOCUMENTS

| | | | |
|---|---|---|---|
| 2,375,245 | 5/1945 | Pretzel . | |
| 4,591,412 | 5/1986 | Hechler . | |
| 4,929,308 | 5/1990 | Gerault et al. ............ | 162/145 |
| 5,151,226 | 9/1992 | Anton et al. . | |
| 5,480,602 | 1/1996 | Nagaich .................. | 264/122 |
| 5,554,330 | 9/1996 | Flannery et al. ........... | 264/113 |

FOREIGN PATENT DOCUMENTS

| | | |
|---|---|---|
| 0 355 515 | 2/1990 | European Pat. Off. . |
| 0 608 949 A1 | 8/1994 | European Pat. Off. . |
| 2 663 350 | 12/1991 | France . |
| 32 45 390 C1 | 1/1984 | Germany . |
| 38 28 655 C1 | 5/1990 | Germany . |

OTHER PUBLICATIONS

European Patent Office Search Report (26 Feb. 1998) for foreign counterpart application EP 97 10 3169.

Opderbeck, F., et al., Das Papier 22 Über die Herstellung nicht–gewebter Faserflächenprodukte, pp. 679–696 (1968).

*Primary Examiner*—Mary Lynn Theisen
*Attorney, Agent, or Firm*—Harness, Dickey & Pierce, P.L.C.

[57] ABSTRACT

The invention relates to a method for producing plate-shaped or contoured components from an aqueous suspension containing 20 to 50% by weight of natural fibers, up to 4% by weight of a fixing agent and as the remainder of the suspension, thermoplastic material comprising a powder or fiber-like materials or a combination thereof. The components are made by a process comprising the steps of depositing the suspension on a screen, drying, heating and shaping the component under pressure.

7 Claims, No Drawings

PRODUCTION OF THERMOFORMABLE COMPONENTS

CLAIM OF PRIORITY

This application claims priority under 35 U.S.C. § 119 to German Patent No. 196 20 289.2, filed on May 21, 1996.

FIELD OF THE INVENTION

The invention relates to a method for producing components, such as plate-shaped semi-finished goods and contoured shaped bodies.

BACKGROUND OF THE INVENTION

European Patent Publication EP 0 039 292 discloses the production of components from a suspension of glass fibers, polypropylene (PP) powder, bonding fibers and other auxiliary materials, and the shaping of components of this suspension by employing pressure and heat.

German Patent Publication DE 36 36 864 describes the use of a suspension made of glass fibers and thermoplastic bonding materials for the production of shaped bodies by depositing the suspension, drying it, heating it and then pressing it into a contour tool.

U.S. Pat. No. 4,929,038 discloses the use of a suspension of inorganic reinforcement fibers, for example glass fibers, or organic fibers, having high melting points, bonding fibers and thermoplastic powder for producing three-dimensional shaped bodies. The three dimensional bodies are formed by depositing the suspension into a preform in a mold, drying the preform, heating the preform, and then molding the preform under pressure.

Glass fibers and other inorganic reinforcement fibers are unpleasant to handle. They can cause skin irritation or allergies. Furthermore, synthetic reinforcement fibers with high melting points are expensive, and in some cases, these fibers can be difficult to recycle. Elaborate formulas with a multitude of chemicals are employed for producing fiber material suspensions with glass fibers. These formulas are difficult to manage and in some cases, may cause waste water pollution problems.

OBJECT OF THE INVENTION

It is an object of the invention to produce thermoplastic bonded shaped bodies or semi-finished goods, while foregoing to the greatest extent the use of synthetic materials and auxiliary process materials, such as dispersion or bonding agents.

DETAILED DESCRIPTION OF THE INVENTION

In accordance with the present invention, a process is claimed for producing plate-shaped or contoured components. The components are produced from an aqueous suspension comprising 20 to 50% by weight natural fibers, up to 4% by weight of a fixing agent, and a powder or fiber-like thermoplastic material or a combination thereof. The process for producing the components comprises the steps of depositing the suspension on a screen, drying, heating and then shaping the component by using pressure.

In accordance with a preferred embodiment of the process, the aqueous suspension is diluted such that 0.4 to 1.0% by weight of the suspension is total solids. Preferably, the natural fibers are 30 to 45% by weight of the total solids of the suspension.

Synthetic quaternary ammonia compounds or natural poly-saccharides or a combination thereof can be added to the suspension as natural fixing means. In a preferred embodiment, the percentage of synthetic or natural fixing agents is 0.2 to 2.5% by weight of the total solids of the suspension.

The thermoplastic material can consist of powder or fibers or a combination thereof, and approximately up to one-half of the thermoplastic material can be powder or fibers. Bast fibers (flax, jute, hemp) and/or hard fibers (sisal, ramie) and/or wood fibers can be added as natural fibers.

Shaping of the suspension into plate-shaped semi-finished goods or contoured components can take place in accordance with any known process. For example, one process includes depositing the suspension on a contoured shaping screen or preform similar to the contour of the finished product, dewatering, drying and heating the preform to a temperature above the melting point of the polymer matrix and pressing it into the desired shaped body in a cooled shaping tool. A second process includes the steps of depositing the suspension of fiber material on a round or flat screen, drying, heating, compressing and cooling the suspension to form a flat semi-finished material, which can then be processed by extrusion into a shaped body.

The components produced by the present invention have several advantages. First, the components are less hazardous to the environment because natural fibers are used in place of glass fibers and there are fewer hazardous chemicals in the suspension. Second, the components made by the present method have improved extrudability during the pressing process and have reduced density along with good mechanical processing properties.

The invention will be explained in more detail by means of the following examples. Percentage statements are in % by weight and relate to the total solids content in the suspension.

EXAMPLES

Example 1

The following were added to water in a vat:
40% flax fibers
30% PP powder
30% PP cut fibers
0.5% quaternary ammonia compounds as fixing agent.

Following dilution to a solids content of 0.5%, preshaping on a contoured screen took place. The preshaped material was dried in hot air at 130° C. in a flow-through process. After plastification at a shaped form temperature of 210° C., pressing into a compressed shaped form took place in a tool heated to 90° C.

Example 2

The suspension of Example 1 was diluted to a solids content of 0.5%, the production of a pre-compressed plate-shaped semi-finished product took place on an installation for non-wovens. After plastification at 210° C., the semi-finished material was pressed into a three-dimensional shaped form in a press.

Example 3

The following were added to water in a vat:
25% flax fibers
15% sisal fibers
30% PP powder
30% PP cut fibers
0.3% quaternary ammonia compounds as fixing agent.

Following dilution to a solids content of 0.5%, the production of the shaped forms took place as in Examples 1 and 2.

Example 4

The following were added to water in a vat:
25% flax fibers
10% fiberized wood fibers
35% PP powder
30% PP cut fibers
0.3% quaternary ammonia compounds as fixing agent Following dilution to a solids content of 0.5% the production of the shaped forms took place as in Examples 1 and 2.

Example 5

The following were added to water in a vat
35% flax fibers
40% PP powder
25% PP cut fibers
0.3% synthetic quaternary ammonia compounds as a fixing agent
1.0% natural anionic polysaccharide as a fixing agent Following dilution to a solids content of 0.5%, the production of the shaped forms took place as in Examples 1 and 2.

Example 6

The following were added to water in a vat:
35% flax fibers
38% PP powder
25% PP cut fibers
1.5% natural cationic polysaccharide as a fixing agent.

Following dilution to a solids content of 0.5%, the production of the shaped forms took place as in Examples 1 and 2.

The components created in accordance with Examples 1 to 6 had the mechanical properties set forth in Table 1.

| Examples | 1 | 2 | 3 | 4 | 5 | 6 |
|---|---|---|---|---|---|---|
| Density (g/cm$^3$) | 1.03 | 1.08 | 1.05 | 1.03 | 1.02 | 1.03 |
| Flexural Strength (N/mm$^2$) | 75 | 85 | 80 | 75 | 80 | 78 |
| Modulus in Flexure (N/mm$^2$) | 2700 | 2800 | 2700 | 2550 | 2600 | 2600 |
| Impact Resistance (mJ/mm$^2$) | 45 | 55 | 50 | 35 | 40 | 40 |

What is claimed is:

1. A method for producing thermoformable components comprising the steps of depositing a suspension comprising 20 to 50% by weight of natural fibers including at least 20% by weight of bast fibers, 0.2 to 2.5% by weight of natural-based fixing agent and thermoplastic material on a screen, drying the suspension, heating the dried suspension and shaping the suspension into a component under pressure.

2. The method of claim 1, wherein the solids are diluted to 0.4 to 1.0% by weight of the aqueous suspension.

3. The method of claim 1 wherein the percentage of natural fibers is 30 to 45% by weight of the total solids in the suspension.

4. The method of claim 1 wherein polysaccharides are added to the suspension as a fixing agent.

5. The method of claim 1 wherein about one-half of the thermoplastic material comprises powder or fibers.

6. The method of claim 1 wherein the natural fibers added to the suspension further comprise hard fibers, wood fibers or a combination thereof.

7. The method of claim 1 wherein the thermoplastic material is in the form of about 50% by weight powder and about 50% by weight fibers.

* * * * *